United States Patent [19]
Faggin et al.

[11] Patent Number: 5,920,310
[45] Date of Patent: Jul. 6, 1999

[54] ELECTRONIC DEVICE EMPLOYING A TOUCH SENSITIVE TRANSDUCER

[75] Inventors: Federico Faggin, Los Altos Hills; Joel A. Seely, Milpitas; Timothy P. Allen, Los Gatos, all of Calif.

[73] Assignee: Synaptics, Incorporated, San Jose, Calif.

[21] Appl. No.: 08/751,182

[22] Filed: Nov. 15, 1996

[51] Int. Cl.⁶ .............................. G08C 21/00; G09G 5/00
[52] U.S. Cl. .................... 345/173; 345/174; 345/901; 178/18.01; 178/18.03; 178/18.07
[58] Field of Search .................................. 345/156, 158, 345/159, 169, 173, 174, 901; 178/18.01, 18.03, 18.07, 19.03, 20.01

[56] References Cited

U.S. PATENT DOCUMENTS

| | | | |
|---|---|---|---|
| 5,305,017 | 4/1994 | Gerpheide | 345/174 |
| 5,469,194 | 11/1995 | Clark | 345/173 |
| 5,495,077 | 2/1996 | Miller et al. | 345/173 |
| 5,583,539 | 12/1996 | Hiketa | 345/173 |
| 5,628,031 | 5/1997 | Kikinis et al. | 345/173 |
| 5,644,516 | 7/1997 | Podwalny | 345/901 |

*Primary Examiner*—Vijay Shankar
*Attorney, Agent, or Firm*—Malcolm B. Wittenberg

[57] ABSTRACT

An electronic device is provided making use of a touch pad module to implement user input functions. The electronic device includes a case having a region of thinner cross section than the remaining case side wall for receiving the touch pad module. The case is further provided with a through hole in the area of its thinner cross section for receiving control electronics of the touch pad module enabling the region of thinner cross section to physically support the touch pad module so that the module can be thinner than what is conventionally believed to be necessary to maintain its physical integrity while in use as an input device.

15 Claims, 7 Drawing Sheets

ELECTRONIC DEVICE EMPLOYING A TOUCH SENSITIVE TRANSDUCER

TECHNICAL FIELD OF THE INVENTION

The present invention involves an electronic device, such as a notebook computer which makes use of a touch pad module to implement user input functions. The physical interface between the touch pad module and case housing the electronic device have been reconfigured enabling extremely thin modules to be employed which heretofore have been deemed to be impractical.

BACKGROUND OF THE INVENTION

As noted above, the present invention involves an electronic apparatus which makes use of a touch pad device to implement all or a part of its user input functions. Notebook and desktop computers as well as copiers are typical examples of such electronic apparatus having need for a touch pad device such as that disclosed herein. When used in conjunction with a computer, a touch pad allows the user to manipulate a graphics cursor on a CRT display. The touch pad comprises a sensitive planar surface and a means for detecting the position of an object, such as a finger or a stylist, near, or in contact with, the sensitive planar surface. The touch pad continuously communicates this position information to the electronic apparatus typically at a rate of from 40 to 100 Hz.

The touch pads disclosed herein can be characterized as having a physical transducer by which the touch pad detects the location of the above-noted finger or stylus. For capacitive touch pads, the sensor surface typically consists of two perpendicular rows of electrodes separated by a thin dielectric layer. For resistive touch pads, the sensor surface may consist of two resistive layers separated by spacers. For most known types of touch pad devices, the sensor surface itself can be constructed from very thin materials and may be no more than a few tenths of a millimeter in total thickness. Capacitive touch pads based on Synaptics' sensor technology, for example, have been constructed with a sensor surface of only 0.25 mm in thickness. Typically, the sensor surface is covered by a thin protective layer which is both durable and pleasant to the touch. Many touch pads use textured Mylar (polyester) appliques between 0.1 mm and 0.3 mm in thickness as a protective layer.

Control electronics are used in conjunction with the sensor surface which consist of a set of electronic components used to process electrical signals produced by the sensor surface and communicate those electrical signals to the host electronic apparatus. For many types of touch pads, the control electronics consist of an integrated circuit to directly record and process sensor signals, a micro controller chip which handles control functions and interface with the host electronic apparatus and a handful of discreet components such as resistors, capacitors, ceramic resonators and crystals used in support of either the sensor integrated circuit or the micro controller. For some touch pad modules, the sensor integrated circuit and micro controller functions are subsumed within a single chip. All known resistive and capacitive touch pad technologies require some amount of control electronics in order to function.

In addition to the above, the typical touch pad module requires some means of connecting output from the control electronics to the host electronic device or apparatus. What is typically used is a flat flexible cable which consists of a thin flexible substrate made of, for example, Kapton, with several evenly spaced conductive (usually metal) strips deposited on its surface. Typically, the conductive strips are covered with an insulator except within a few millimeters of either end of the cable. The conductors are exposed at their ends to facilitate electrical connection when inserted into a mating connector. Typically, flat flexible cable used with touch pad modules use 4.10 conductors (pins) to carry the power supply and interface signals to the touch pad. Devices which use a flat flexible cable, including touch pads, typically include a mating connector mounted on their PC boards or, alternatively, the exposed metal conductors at the ends of the flat flexible cable may be soldered directly to matching pins on a PC board.

It is the usual practice to provide the touch pad module as a self-contained unit which includes the sensor surface, control electronics and some means for connecting the module to the host electronic device. The touch pad module communicates with the host system via one of several pre-defined communication protocol standards, for example, PS/2 or RS-232 protocols for touch pad modules used in notebook computers. Vendors of touch pad modules usually sell assembled units to customers which are traditionally manufacturers of notebook computers or some other type of electronic host system. Customers generally require that the touch pad module be reasonable easy to install into and remove from the host system. The touch pad module is typically delivered as a printed circuit board with the sensor surface disposed on one side and the control electronics mounted on the other. For capacitive touch pads, such as the Synaptics touch pad, a typical PC board might be 50 mm by 65 mm in rectangular dimension and 2 mm in thickness.

In vending a touch pad module to an end user, the module manufacturer generally defines a "keep-out zone" which is a three-dimensional spatial region in the shape of the minimum rectangular prism which encloses all of the control electronics as well as the flat flexible cable connector, if any. As an example, for the Synaptics standard touch pad module model TM 1202SPU, the keep-out zone is a box approximately 35 mm by 40 mm by 3 mm roughly centered on the reverse (non-sensor) side of the PC board.

A touch pad module can be made flexible by producing it in the form of a thin, flexible printed circuit material instead of a conventional printed circuit board. Commonly used flexible circuit technologies include Mylar substrates, screen printed with conductive inks as well as Kapton substrates with deposited metal traces. Both of these technologies are suitable for forming multi-layer circuit patterns and both provide methods for mounting the control electronics components onto substrates. In either case, the thickness of the flexible substrate is typically less than 0.3 mm.

Flexible touch pad modules offer advantages over standard PC board touch pad modules in some applications. For example, the sensor surface of a capacitive touch pad can be formed on a region of the flexible substrate remote from the control electronics, allowing the sensor to be placed flat on the exterior case of the host electronic device without providing any component clearance directly underneath the sensor. Flexible touch pad modules may be capacitive in which case the sensor surface is implemented as an array of electrodes formed by conductive traces on the flexible surface. Resistive touch pads may also be implemented in this regard with the sensor surface formed by application of a pressure-sensitive resistive transduce to the flexible surface substrate.

Virtually all host electronic devices employing touch pads are provided with a case, generally configured of plastic which houses the various electronic components making up the host system. In the case of a notebook computer, a palm rest is provided in which the typical touch pad is mounted. The palm rest generally consists of a plastic panel beneath the notebook computer keyboard on which the user rests the palms of his hands while typing. Typical palm rests are made of textured plastic between 1.5 mm and 2 mm in thickness and, as noted above, the palm rest is generally an integral part of the structure of the system's case.

When the touch pad module is applied to the plastic case of the host electronic device, it is generally installed with a suitable bezel. The bezel is provided as a rim which surrounds the sensor surface of the touch pad module. The bezel performs a cosmetic function covering any gap between the edge of the sensor surface and the surrounding plastic case. It also performs a necessary ergonomic function which affects the quality of the user interface. If the bezel has appreciable depth, typically 0.5 mm to 1.0 mm, then it provides tactile feedback when the user's finger has reached the edge of the sensor surface. In practice, systems designed without a bezel are unsatisfactory because users do not notice when their fingers pass beyond the edge of the sensor surface causing the user to become confused when the pointing action unexpectedly stops. A practical design for a touch pad mounted in a palm rest or other suitable plastic case will generally include some sort of bezel.

Figure 1:
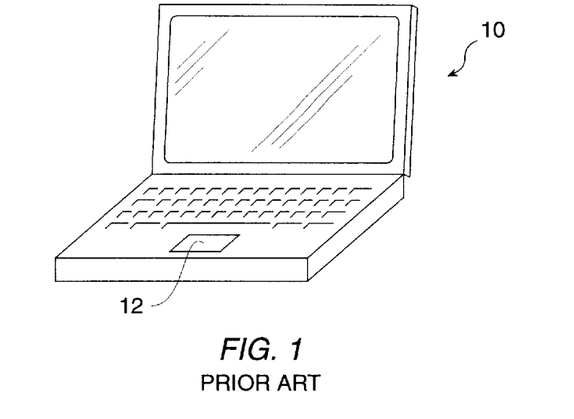
FIGS. 1 to 8 represent prior art depictions of a notebook computer (FIG. 1), touch pad modules (FIGS. 2, 3, 5, 6 and 8) as well as cross sectional views of such modules installed within a suitable case material of a host electronic device (FIGS. 4 and 7).

To further appreciate the environment in which the present invention is intended to occupy, reference is made to FIGS. 1 to 8 depicting prior art configurations. Specifically, FIG. 1 shows a notebook computer 10 as an example of a typical host electronic system. It is noted that touch pad 12 is mounted in the palm rest, just below the space bar key of the keyboard. The sensor surface of the touch pad is conveniently accessible to the user and the control electronics are generally mounted on the hidden side of the touch pad module PC board.

Figure 2:
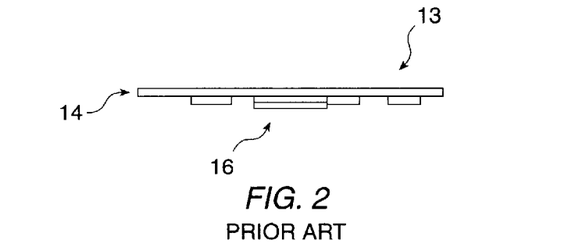

FIG. 2 shows a cross sectional view of a typical touch pad PC board. The sensor surface 13 is disposed on the top side of a printed circuit board 14. The sensor surface may be circuit board traces used as sensing electrodes, for capacitive touch pads, or may be a physically distinct sensor layer, as in resistive touch pads, adhered to the top surface of the circuit board. The circuit board is typically 1.8 mm to 2.0 mm in thickness. The circuit board cannot practically be made thinner than about 1.4 mm or it will flex perceptively under use when mounted as shown in FIG. 4, discussed below.

The control electronics 16, shown in FIG. 2, are mounted on the underside of the printed circuit board. Some of the small discreet components, such as resistors and capacitors, are less than 0.5 mm in thickness. For the Synaptics standard touch pad module model TM 1202SPU, the thickness component of the flat flexible cable connector, shown as element 24 in FIG. 3, adds 2.9 mm to the module depth. Other components, such as the micro controller or sensor control IC, are between 1.0 mm and 2.2 mm in thickness for each of the touch pads available from Synaptics, Alps and Logitech.

Figure 3:
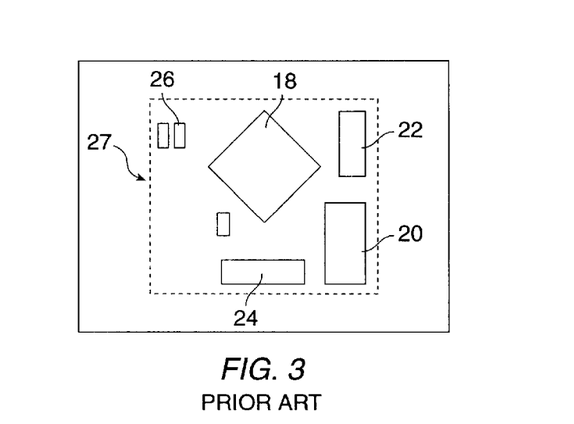

FIG. 3 shows a plan view of the component side of a typical touch pad module, in this case, the Synaptics touch pad model TM 1202SPU. The components making up the control electronics include sensor controller ASIC 18, micro controller chip 20, the ceramic resonator 22, flat flexible cable connector 24 and various discreet components 26. Synaptics has specified a keep-out zone indicated by the dotted box 22.

Figure 4:
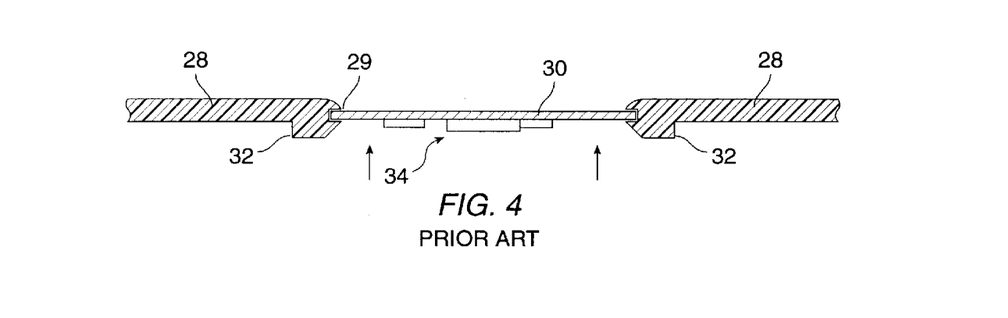

FIG. 4 shows the cross section of a palm rest incorporating a touch pad of the type shown in FIGS. 2 and 3. The palm rest is typically composed of a plastic material such as ABS, between 1.5 mm and 2 mm in thickness, shown as element 28 therein. The palm rest is molded with an integral bezel opening 29 for touch pad module 30. Often, the palm rest will include integrally-molded mounting brackets 32, designed to support the touch pad module and allow it to be snapped from the underside of the case. Alternatively, the palm rest may provide for mounting screws (not shown) or other means for securing the touch pad from behind. When mounted as shown in FIG. 4, the touch pad control electronics 34 and/or mounting brackets will impinge from 2–5 mm into the interior space of the host system. In many host systems, this impingement causes grave difficulties. In some notebook computer systems, for example, the battery is placed directly below the palm rest. Since the control electronics protrude into the space in an irregular 3-D shape, the battery must be significantly reduced in size in order to fit in the space available.

Figure 5:
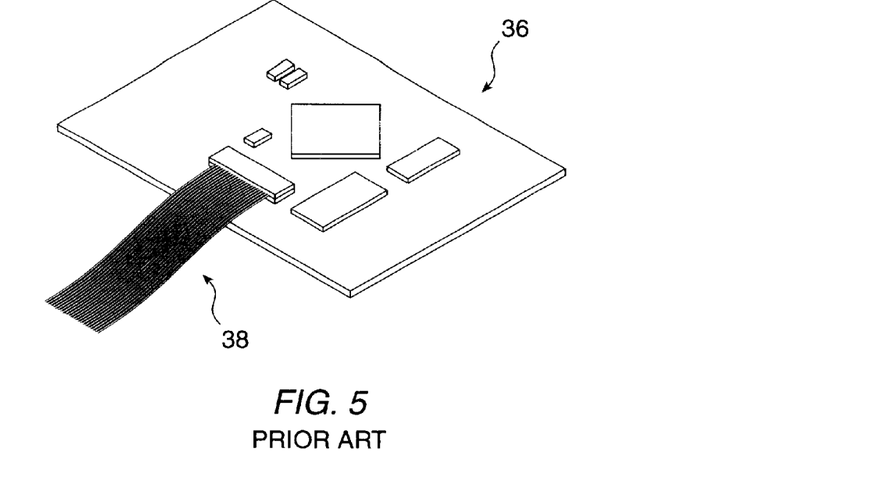

Turning to FIG. 5, typical means by which touch pad modules are connected electrically to their host systems is shown. Touch pad module 36 is shown component-side up for clarity. Usually, one end of a small flat flexible cable 38 is inserted into a mating connector on the touch pad module 36. The other end of the flat flexible cable is inserted into another mating connector in the host system (not shown).

Figure 6:
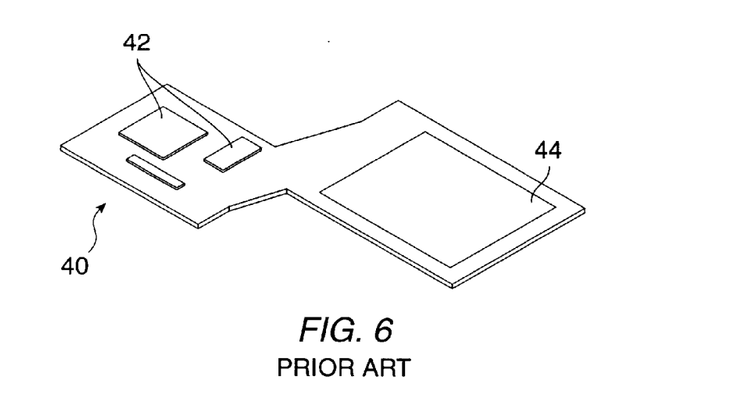
Figure 7:
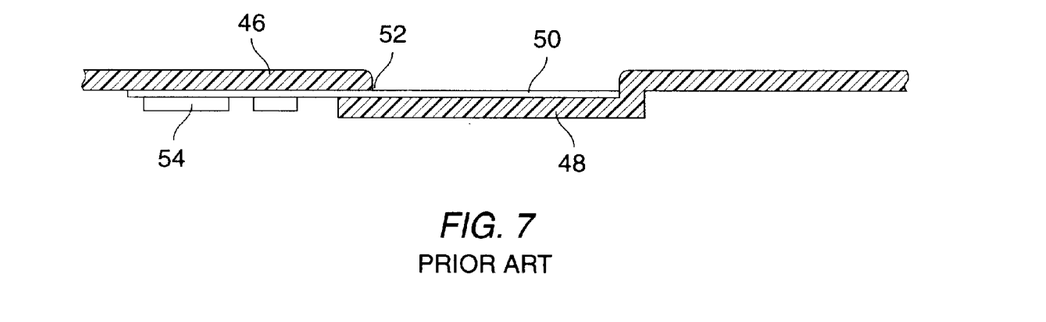

FIGS. 6 and 7 are directed to flexible touch pad modules. Turning to FIG. 6, sensor surface 44 is disposed on one end of a rectangular flexible circuit substrate 40 with control electronics 42 mounted on the underside of the other side. FIG. 7 shows a cross section of a typical installation of a flexible touch pad module in a palm rest. Palm rest 46 is molded with an integral depression 48 to support sensor surface 50 while a slot 52 through which the flexible sensor is passed during installation is provided. A thin adhesive layer is applied to supporting surface 48 which holds sensor surface 50 in place. A suitable adhesive is available from 3M. The control electronics 54 is located in another area of the palm rest where there may be more clearance inside the host system. This configuration may be useful in applications where space is limited underneath the sensor surface but less limited elsewhere. It is to be noted that even though the sensor surface 50 itself is quite thin, on the order of 0.25 mm, it still needs to be supported by a stiff backing plate 48. In general, this backing plate is no thinner than the PC board of a standard touch pad module as shown in FIGS. 2 and 3. It is apparent that the use of a flexible touch pad module does not significantly reduce the volume occupied by the touch pad module and its components; it only rearranges the space in a way that may be beneficial to some specific electronic device host system designs.

Figure 8:
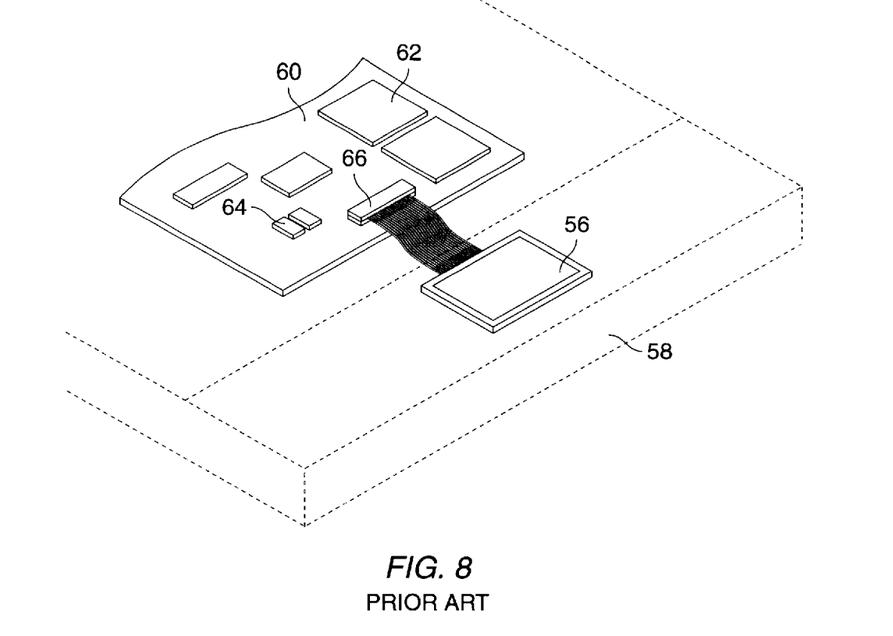

FIG. 8 shows an alternative mounting arrangement for a touch pad which is currently being developed by the assignee of the present application in conjunction with certain OEM customers. The touch pad sensor surface 50 is formed on a flexible circuit substrate, such as Mylar or Kapton. The flexible circuit only implements the touch pad sensor electrodes and does not include any of the control electronics. The touch pad control electronics 64 are mounted on the host system's motherboard 60 or any other convenient circuit board already present in the host electronic device. The motherboard includes many other components 62 not related to the operation of the touch pad. The flexible sensor surface is plugged into connector 66 mounted near and connected to the control electronics 64 on the motherboard. This mounting arrangement offers a very compact solution for the touch pad sensor surface which can be mounted directly to the exterior of the palm rest. For host systems which can afford the space for the control electronics on the motherboard, the solution offers excellent space utilization. However, many systems cannot accommodate any amount of touch pad control electronics mounted on the motherboard where space may already be scarce. Additionally, most OEM customers would prefer to buy integrated touch pad modules rather than separate sensor surfaces and control electronics which must be assembled and tested by the system integrator.

As is quite apparent from the above discussion, the physical dimensions of a touch pad module are critical determinants of whether a particular module can be employed in a host system. Historically, small size and, in particular, reduced thickness, has been a highly desirable feature of electronic components and subsystems. The relentless trend towards more functionality in smaller and smaller systems is well known and represents an area of enormous expenditures of research and development effort on the part of electronic system integrators.

A particularly space-constrained electronic product is the notebook computer. Users expect most of the functions of their desktop systems, including a large hard disk drive, a floppy disk drive, a high resolution display, a usable keyboard, pointing device, memory, CD-ROM drive, stereo speakers, a large battery and more fit into a space not much bigger than a desktop computer keyboard. As a consequence, touch pads have become the pointing device of choice in notebook computer systems, achieving a market share of 50% in less than two years, principally because they are thin. Touch pads displaced track balls because, among other reasons, notebook computer manufacturers could reduce the volume consumed by such pointing devices. This allowed notebook computer manufacturers to provide users with longer battery life and/or additional functionality, like CD-ROM drives, by utilizing the space previously occupied by the track ball. In the past year, the trend towards very thin notebook computers has grown stronger. Ultra-thin, light notebook computers, such as the IBM 560, have been well-received by the market and such positive reception has encouraged all manufacturers to reduce thickness wherever and whenever possible.

Several vendors of touch pad pointing devices, including Synaptics, Alps and Cirque, have responded to OEM customer's demand for thinner devices in various ways. Synaptics has offered a flexible touch pad module, its TM3002, which has been adopted by several notebook manufacturers. This device sells for roughly twice the price of the corresponding PC board-based standard touch pads and provides no additional functionality other than its reduced thickness in the area of the sensor surface. Demand for this product is growing rapidly despite the strong price differential. Some companies, like Interlink Electronics, have introduced new products into the marketplace by promoting reduced thickness as their major competitive differentiation.

In light of the strong demand, touch pad module manufacturers have sought a standardized design that will provide customers with a manufacturable, inexpensive touch pads with no reduction in performance that takes up the smallest possible amount of space in the electronic host system. Prior to the present invention, vendors have explored several alternative means of making a thin touch pad module. One straightforward idea was to use the minimum thickness components available for the control electronics seeking to provide all necessary components in packages of no more than 1 mm in thickness. These thin components can be mounted on a reduced-thickness PC board. However, if reduced-thickness touch pad modules are mounted in a palm rest according to the accepted means as shown in FIG. 4, there is a practical limit on how thin the PC board substrate can be. Notably, the board must be stiff enough to span the touch pad mounting hole in the palm rest which is typically 40 mm to 60 mm while being supported only by its edges and without flexing appreciably under hard use. To meet these requirements, a conventional PC board must be at least 1.4 mm in thickness. The added 1 mm of the control electronics brings the overall touch pad module thickness to 2.4 mm, not including the brackets or mounting hardware needed to support the touch pad module from behind as shown, for example, as item 32 in FIG. 4. For many electronic devices, such a composite touch pad module is unacceptably thick.

The assignee of the present application has also pursued flexible touch pad modules as a method for relieving space constraints in the area of the sensor surface. Such modules can be made as thin as 0.25 mm in the region of the sensor surface. This thin, flexible sensor membrane can be applied directly to the exterior of the host system's case and offers a minimal thickness solution. Such a system is shown in FIGS. 6 and 7. While flexible touch pad modules satisfactorily address component clearance issues underneath the sensor surface, they have only really pushed the problem elsewhere. In the example shown in FIG. 7, the components have been relocated to the left of the sensor surface, not eliminated. In general, the solution may create as many problems as it solves.

In addition to the above, flexible touch pad modules are more difficult and expensive to manufacture. Kapton-based flexible printed circuits are two to four times as expensive as corresponding multi-layer PC boards per unit area, and the area required for the flexible touch pad module shown in FIGS. 6 and 7 is roughly 2.5 times that of a standard touch pad module PC board. Multi-layer Mylar-based screen printed circuit boards are considerably less expensive than Kapton surfaces but the process of attaching electronic components to a Mylar circuit is rather expensive, not widely available and less reliable than a standard printed circuit board assembly process.

It is thus an object of the present invention to provide a relatively inexpensive touch pad module, with no reduction in performance over competing touch pad modules that take up the smallest possible amount of space in a host electronic device.

This and further objects will be more readily apparent when considering the following disclosure and appended drawings.

BRIEF DESCRIPTION OF THE DRAWINGS

As noted previously.

SUMMARY OF THE INVENTION

The present invention deals with an electronic device having various internal parts which makes use of a touch pad module to implement user input functions. The touch pad module comprises a preferably planar sensor surface having a length and width for detecting the position of an object near or in contact with said sensor surface and control electronics which electrically communicate said position information to said electronic device.

The electronic device is provided with a case for housing its various internal parts, the case having a side wall for mounting the above-referenced touch pad module. The side wall of the case is provided with a region of thinner cross section than the remaining case side wall whereby the region of thinner cross section is of the approximate length and width of the sensor surface. Within the region of thinner cross section is provided a through hole in the case for receiving the control electronics of the touch pad module, the through hole being of a size substantially smaller than the region of thinner cross section.

DETAILED DESCRIPTION OF THE INVENTION

As noted above, the present invention is directed to a configuration for arranging the physical components of a touch pad module and a method for mounting the module in the case of the suitable electronic device such that it protrudes minimally, or not at all, into the interior volume of the host system. As noted above, FIG. 9 shows, in cross section, a thin conventional capacitive touch pad module formed from standard multi-layer printed circuit board 68 with control electronics 70 mounted on the reverse side from the sensor surface. The printed circuit board 68 is only 0.5 mm in thickness which is not rigid enough in and of itself to allow the touch pad module to be mounted as shown in FIG. 4. Significantly, multi-layer circuit boards which are less than 0.5 mm in thickness have become commonplace but, as noted previously, circuit boards which are thinner than approximately 1.4 mm cannot be mounted as shown in FIG. 4 for they will flex perceptively under use when finger or stylus pressure is applied thereto.

Figure 9A:
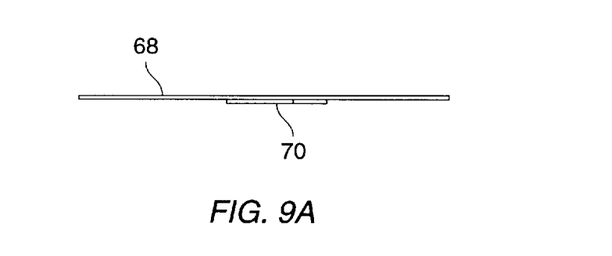
FIGS. 9*a* and *b* show side and plan views, respectively, of a touch pad module produced pursuant to the present invention.
Figure 9B:
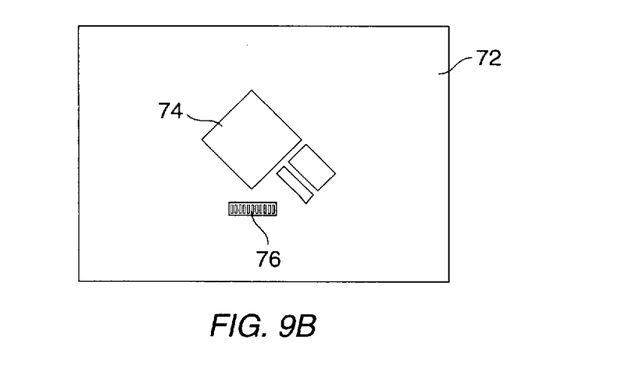

FIG. 9a shows, in plan view, the component side of applicant's thin touch pad module. All of the control electronics 74 are selected to use the thinnest available packages and all of the components are ideally clustered as tightly as possible near the center of circuit board 72. As illustrative of this concept, applicant has produced a capacitive touch pad mounting all necessary components within a rectangle 28 mm by 21 mm in size. Instead of a thick flat flexible cable connector, a pattern of exposed, solderable pad 76 is also clustered near the center of the board to provide for electrical connection to the electronic host device.

Figure 10:
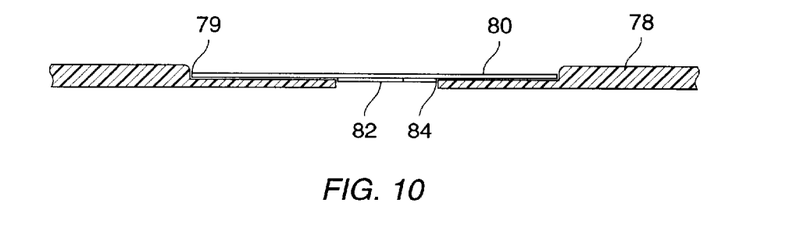
FIG. 10 depicts, in side view, the module of FIGS. 9*a* and *b* supported by a portion of a case of a suitable electronic host device.

FIG. 10 shows how applicant's touch pad module 80 is mounted on a suitable device case, such as on the palm rest of a notebook computer. Palm rest material 78, typically 1.5 mm to 2 mm in thickness is molded with recess 79 deep enough and large enough to accommodate a thin touch pad module circuit board which is generally about 50 mm by 6 mm by 0.6 mm. An important aspect of the present invention is to provide through hole 84 either molded or cut into region of thinner cross section 90 (FIG. 11) which is large enough to accept control electronics 82 and the above-recited connection pads. When thin touch pad module 80 is mounted as shown, the region of thinner cross section 90 will be approximately 1.3 mm in thickness noting that this region has been produced by reducing the case side wall of 2 mm by providing a recess of approximately 0.7 mm. If the tallest of the touch pad module control electronics components is 1 mm, none of the control electronics will protrude at all into the host electronic device's interior space.

Figure 11:
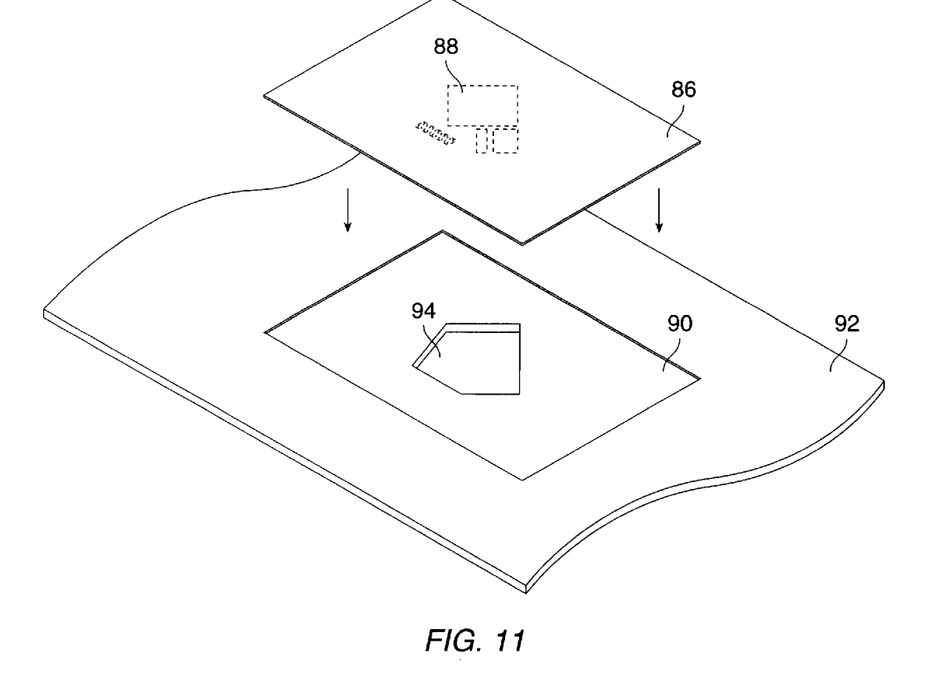
FIG. 11 shows the configuration of FIG. 10 in perspective view as the touch pad is applied to its supporting surface.

FIG. 11 shows an exploded perspective view of the configuration shown in FIG. 10. Again, there is a region of thinner cross section 90 formed within case material 92 large enough and deep enough to accommodate the touch pad module circuit board. Through hole 94 is large enough to accommodate the touch pad module control electronics 88 mounted on the underside of the circuit board. A thin touch pad module 86 can be affixed to region 92 by applying a very thin layer of adhesive to the interior of region of thinner cross section 90 or, alternatively, to the exposed area of the underside of the touch pad PC board.

Figure 12:
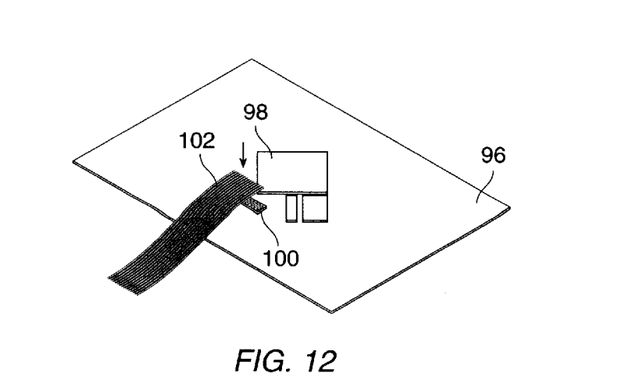
FIG. 12 shows the underside of the touch pad module of the present invention together with a flat flexible cable for connecting the control electronics of the touch pad module to a surrounding host electronic device (not shown).
Figure 13:
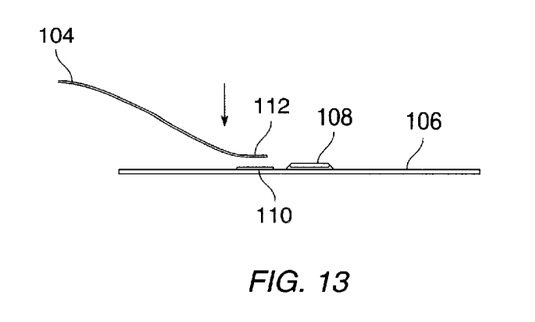
FIG. 13 shows the touch pad module of the present invention in side view as a suitable flat flexible cable as being attached thereto.

Since the flat flexible cable mating connector used in most standard touch pad modules is so thick, it is desirable to eliminate it entirely in the thin touch pad design of the present invention. In this regard, FIGS. 12 and 13 show how a flat flexible cable can be directly attached to the surface of the touch pad module without the use of a bulky connector. Specifically, FIG. 12 shows a thin touch pad module 96 shown component side up for clarity. The exposed connector pads 100 arranged so that their spacing matches the spacing of the conductors on a suitable flat flexible cable 102, typically 1.0 mm center to center. Control electronics 98 are shown for reference.

FIG. 13 shows the same thin touch pad module 106 in cross section. Control electronics 108 are soldered to the printed circuit board using standard surface-mount technology techniques. Exposed conductors 112 of the flat flexible cable 104 are soldered directly to the touch pad's connection pads 110. This can be accomplished by, for example, coating the connection pads 110 with a layer of solder or solder paste as is the norm in most SMT techniques. This is followed by placing the exposed conductors 112 of the flat flexible cable 104 in direct contact with connection pads 110 while applying heat with a hot bar pressed against the back of the cable as shown by the arrow within FIG. 13. The applied heat will melt the solder on connection pads 110 and fuse the cable to these connection pads.

Figure 14:
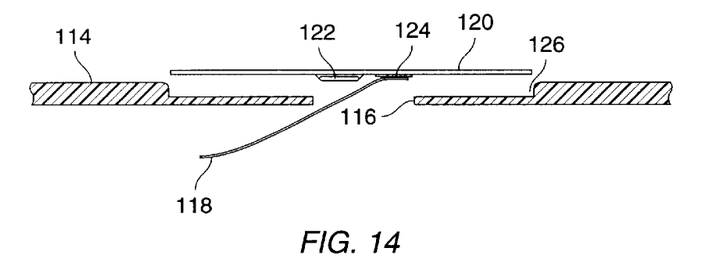
FIG. 14 shows the installation of the touch pad module with a suitable flat flexible cable connector of FIG. 13 to the side wall of a suitable electronic device case.

FIG. 14 shows how the flat flexible cable can be routed from the thin touch pad module to its electronic device host system. FIG. 14 is an exploded cross sectional view of a thin touch pad module mounted in a device case including the same elements as shown in FIG. 10 with the addition of the flat flexible cable 118. As in FIG. 10, the thin touch pad module 120 is mounted in region of thinner cross section 126 in case 114. Through hole 116 provides clearance for control electronics 122 and for the exposed connection pads 124. The end of the flat flexible cable 118 is attached directly to the exposed connection pads 124 as described above. The cable 118 is then routed through hole 116 and thus on to the internal workings of the electronic device.

Figure 15:
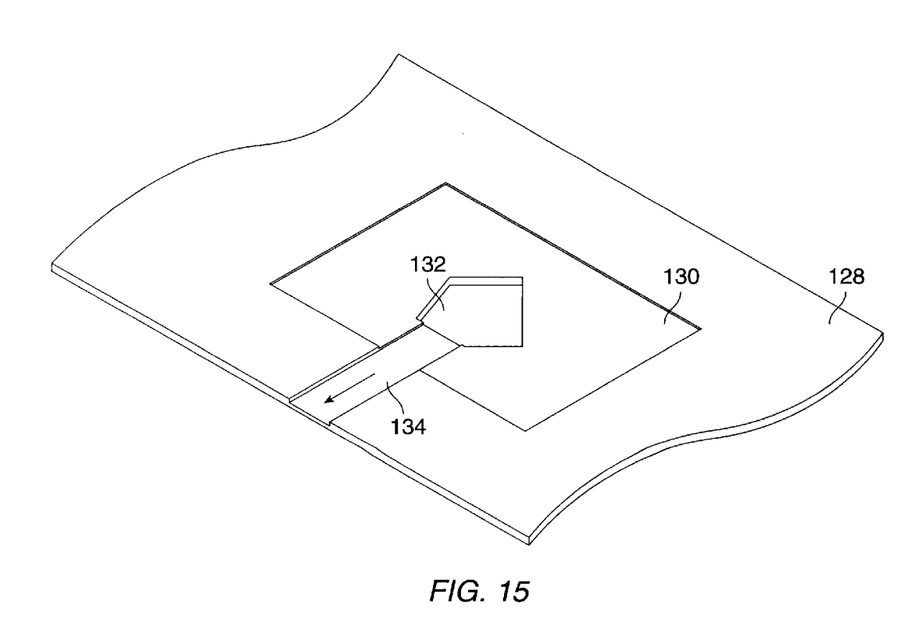
FIG. 15 shows the underside of an electronic device case in the region where applicants touch pad module is to be installed including, as a preferred embodiment, a region for accepting and retaining the above-referenced flat flexible cable connector.

FIG. 15 shows, in perspective, a preferred embodiment of the present invention. Specifically, case 128, such as in the form of a palm rest, is shown with its underside facing up for clarity. Case 128 is formed with region of thinner cross section 130 shown in phantom as well as through hole 132 to accommodate the thin touch pad module control electronics (not shown). As noted above, the flat flexible cable connecting applicant's touch pad module to the host system should pass through hole 132 and then on into the interior of the system. To allow for routing of the flat flexible cable, channel 134 is configured within case 128 emanating from through hole 132 on the anterior side of the case as shown. Suitable flat flexible cable can be laid flat in channel 134 and thus routed away from through hole 132 without protruding into the interior volume of the system. To accommodate a typical flat flexible cable, channel 134 need only be approximately 0.25 mm in depth and approximately 9 mm wide.

Figure 16:
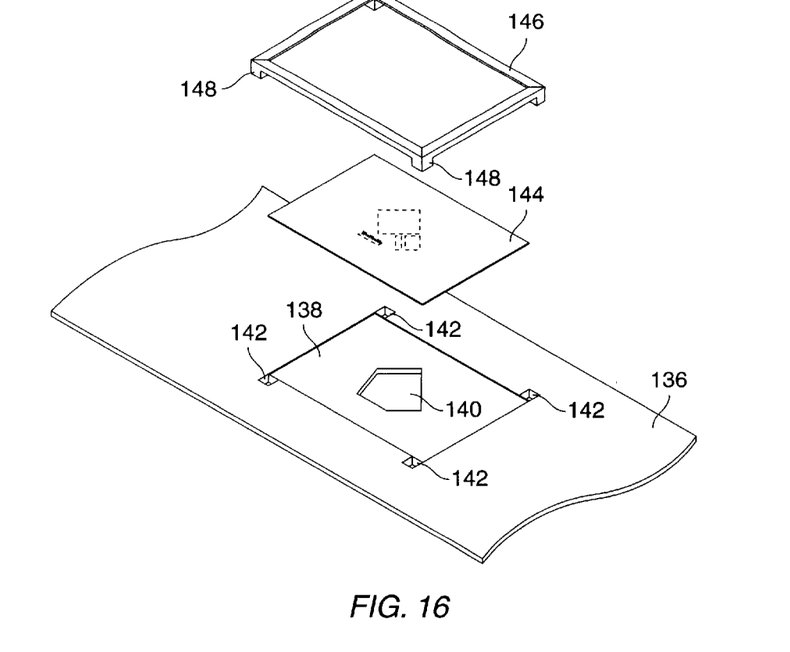
FIG. 16 is a perspective view of the present invention showing the use of a bezel in conjunction with the application of a touch pad module to the case of a suitable electronic host device.
Figure 17:
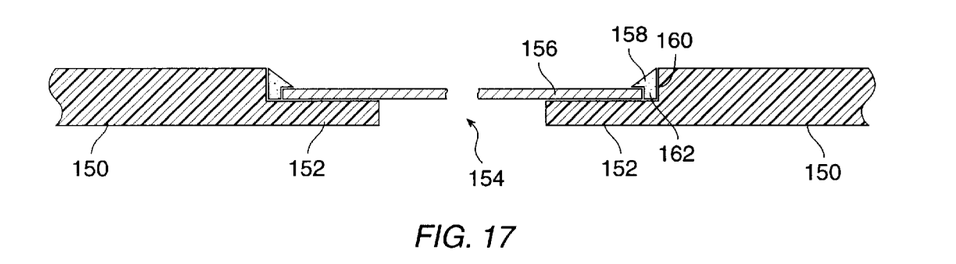
FIG. 17 is a side cross sectional view of the configuration shown in FIG. 16.

FIGS. 16 and 17 show the application of a bezel in conjunction with the mounting of a touch pad module to a suitable electronic device case. As noted, bezel 146 together with touch pad module 144 can be installed within a 2 mm case wall such that the sensor surface of the touch pad module is completely contained within the case wall thickness. As a worst case scenario, the sensor surface could be made flush with case wall 150 while control electronics (not shown) can be made to reside within the thickness of region of reduced cross section 152.

FIG. 16 is an exploded perspective view of thin touch pad 144 mounted within case 136 which could, as noted previously, be the palm rest of a suitable notebook computer. Region of reduced cross section 138 is shown for receiving touch pad circuit board 144 while through hole 140 is provided for the control electronics and flat flexible cable routing as discussed above. Bezel 146 can be affixed to the touch pad or its surrounding case with adhesive or may include integrally-molded snap brackets 148 of a type well known in the prior art. Snap brackets 148, if any, can be accommodated by corresponding holes or depressions 142 in case 136.

FIG. 17 shows how bezel 158 and thin touch pad module 156 can all be included within a 2 mm thick case 150. The case material thickness has been reduced to 1.0 mm in region of thinner cross section 152 underneath touch pad module 156 and bezel 158. The 1 mm thickness in this area 152 allows sufficient clearance 154 for the control electronics (not shown). The edge 160 of region of thinner cross section 152 forms a wall which extends slightly beyond the perimeter of the touch pad module circuit board 156. Bezel ring 158 is molded with a tapered region that overlaps the touch pad PC board (for cosmetic and ergonomic reasons). A stiffening ring 162 is also provided around the perimeter.

For a 0.5 mm thick touch pad circuit board, the bezel taper can be 0.5 mm in thickness without protruding above the top surface of the case.

Figure 18:
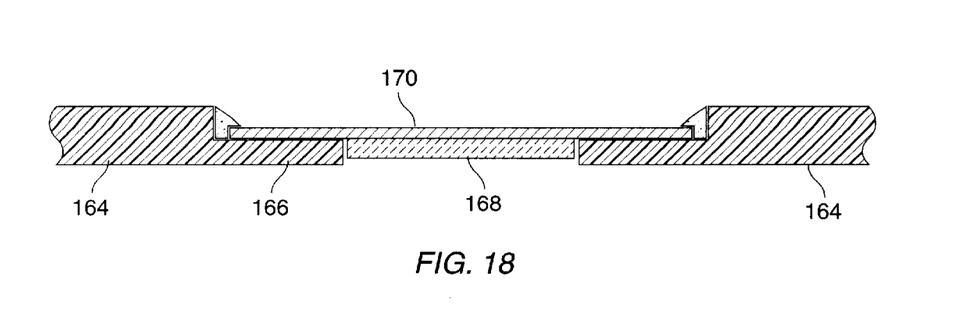
FIG. 18 is a cross sectional view of a preferred embodiment of the present invention wherein a resin is shown as adding structural integrity to the composite package.

As a further preferred embodiment, reference is made to FIG. 18 whereby it is proposed, particularly with regard to ultra thin touch pad module 170, that the control electronics which are extended into the through hole of the region of thinner cross section 166 be packed in a supporting resin, such as epoxy 168. Use of a packing resin within the through hole will not add to the thickness of the touch pad module 170 but will add to the structural integrity of the overall package.

Figure 19:
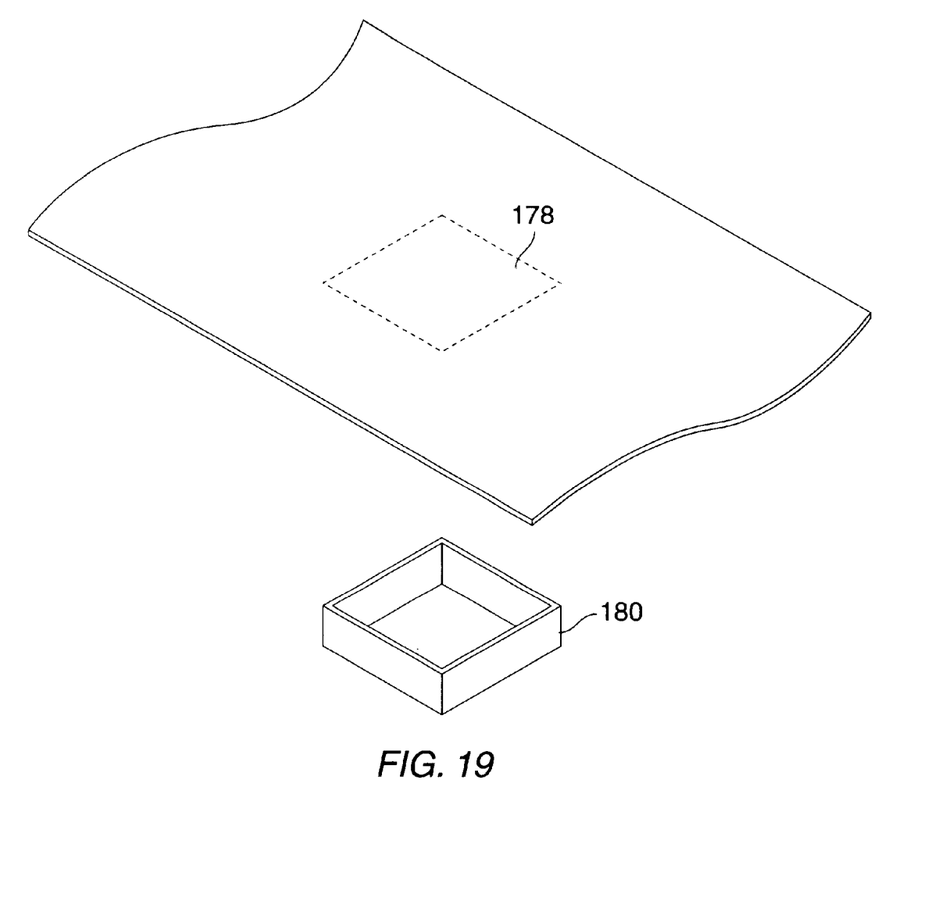
FIG. 19 is a perspective view of yet another embodiment wherein a cap is shown also to add to the integrity of the overall structure.

There are several ways in which a suitable resin can be employed in practicing the present invention. For example, once the touch pad and cable have been applied to case 164 of the host electronic device, epoxy resin 168 can be applied to the through hole encapsulating the control electronics and cable connections (not shown). Alternatively, reference is made to FIG. 19 wherein a prefabricated cup 180 of epoxy resin can be prepared having the dimensions of through hole 178. In addition, relief areas can be configured into cap 180 to embrace the control electronics. In either case, use of an epoxy resin in the through hole may be a valuable expedient in those instances in which an ultra thin touch pad module is employed where the physical integrity of the sensor surface above the through hole may be compromised.

It is quite apparent in practicing the present invention that one is now able to provide a complete touch pad module entirely within the thickness of the case side wall of the electronic host device. It is further readily apparent that, for the first time, one is able to produce a touch pad module employing a PC board of construction thinner than was thought to be practicable, particularly when employing the mounting protocol as shown in FIG. 4 above. By extending the case side wall within the region of thinner cross section, the unusually thin PC board is supported and reinforced in all areas except for the area occupied by the through hole. Because the through hole is of relatively small dimension in comparison to the overall dimension of the touch pad module, the present invention provides sufficient mechanical integrity while providing a touch pad module which is surprisingly thin.

We claim:

1. In an electronic device having various internal parts and which makes use of a touch pad module to implement user input functions, said touch pad module comprising a sensor surface having a length and width for detecting position of an object near or in contact with said sensor surface and control electronics which electrically communicate said position to said electronic device, said electronic device being provided with a case for housing said various internal parts, said case having a side wall for mounting said touch pad module, the improvement comprising providing said side wall with a region of thinner cross section than the remaining case side wall, said region of thinner cross section being of the approximate length and width of said sensor surface and within said region of thinner cross section is provided a through hole in said case for receiving said control electronics, said through hole being of a size substantially smaller than said region of thinner cross section.

2. The invention of claim 1 wherein said electronic device comprises a notebook computer.

3. The invention of claim 1 wherein said electronic device comprises a desk top computer.

4. The invention of claim 1 wherein said electronic device comprises a copier.

5. The invention of claim 1 wherein said touch pad module comprises a printed circuit board wherein said sensor surface is configured on one side of said printed circuit board and said control electronics are configured on the opposite side thereof.

6. The invention of claim 1 wherein a bezel is provided about said sensor surface.

7. The invention of claim 1 wherein said control electronics are clustered proximate to the center of said touch pad module.

8. The invention of claim 2 wherein said side wall for mounting said touch pad module comprises a palm rest.

9. The invention of claim 1 wherein said region of thinner cross section and said touch pad module are sized so that when said touch pad module is installed on said case, said sensor surface is substantially flush with said case.

10. The invention of claim 1 wherein flexible flat cable is provided for connecting said touch pad module to said electronic device.

11. The invention of claim 10 wherein said flexible flat cable is connected to said touch pad module in an area proximate said control electronics and is connected to said electronic device via said through hole.

12. The invention of claim 11 wherein a channel is configured within said case emanating from said through hole on the interior side of said case for accepting and retaining said flexible flat cable.

13. The invention of claim 1 wherein said region of thinner cross section and said touch pad module including said sensor surface and control electronics are sized so that neither said sensor surface nor control electronics extend beyond the thickness of said case side wall.

14. The invention of claim 1 wherein said sensor surface is substantially planar.

15. The invention of claim 1 wherein an epoxy resin has been applied to said through hole to fill said through hole and encapsulate said control electronics.

* * * * *